United States Patent
Campbell et al.

(10) Patent No.: US 11,887,493 B2
(45) Date of Patent: Jan. 30, 2024

(54) SYSTEMS AND METHODS FOR POWER REDUCTION IN FORMATION FLIGHT

(71) Applicant: Bell Textron Inc., Fort Worth, TX (US)

(72) Inventors: Kip Gregory Campbell, Hurst, TX (US); Juan Li, Keller, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 201 days.

(21) Appl. No.: 16/545,938

(22) Filed: Aug. 20, 2019

(65) Prior Publication Data

US 2021/0056857 A1 Feb. 25, 2021

(51) Int. Cl.
*G08G 5/04* (2006.01)
*B64C 39/02* (2023.01)
*G05D 1/10* (2006.01)
*G08G 5/00* (2006.01)
*B64D 31/00* (2006.01)

(52) U.S. Cl.
CPC ............. *G08G 5/04* (2013.01); *B64C 39/024* (2013.01); *B64D 31/00* (2013.01); *G05D 1/1064* (2019.05); *G08G 5/0004* (2013.01); *G08G 5/0069* (2013.01); *B64U 2201/102* (2023.01)

(58) Field of Classification Search
CPC ....................................................... G08G 5/04
See application file for complete search history.

(56) References Cited

U.S. PATENT DOCUMENTS

| | | | |
|---|---|---|---|
| 4,086,841 A * | 5/1978 | MacDonald | F41G 3/22 235/401 |
| 6,483,453 B2 | 11/2002 | Oey et al. | |
| 9,355,423 B1 * | 5/2016 | Slusar | G08G 1/0129 |
| 9,390,451 B1 * | 7/2016 | Slusar | G07C 5/0841 |
| 10,096,067 B1 * | 10/2018 | Slusar | G06Q 40/08 |
| 2003/0032426 A1 | 2/2003 | Gilbert et al. | |
| 2011/0307139 A1 * | 12/2011 | Caminiti | G08G 1/163 701/32.2 |
| 2012/0173900 A1 * | 7/2012 | Diab | H04L 12/10 713/310 |
| 2012/0173905 A1 * | 7/2012 | Diab | H04L 12/66 713/320 |
| 2012/0330542 A1 * | 12/2012 | Hafner | G08G 1/163 701/301 |

(Continued)

FOREIGN PATENT DOCUMENTS

CN 103853156 B 6/2016
CN 108549407 B * 5/2018

(Continued)

OTHER PUBLICATIONS

Google Translation of Chinese Patent Application Pub. No. CN108549407B assigned to Harbin Institute of Technology of Weihai that was filed in 2018 (hereinafter "Harbin").*

(Continued)

*Primary Examiner* — Jean Paul Cass

(74) *Attorney, Agent, or Firm* — Pramudji Law Group PLLC; Ari Pramudji

(57) ABSTRACT

According to one implementation of the present disclosure, a method for formation flight is disclosed. The method includes: during flight, arranging for a first aircraft to fly into a proximity range of a second aircraft; and determining first aircraft positioning based on power consumption data of the first aircraft, where the first aircraft positioning corresponds to power-reducing formation flight of the first aircraft.

20 Claims, 6 Drawing Sheets

(56) References Cited

U.S. PATENT DOCUMENTS

| | | | |
|---|---|---|---|
| 2014/0142787 A1* | 5/2014 | Tillotson | H04K 3/224 |
| | | | 701/3 |
| 2016/0275801 A1* | 9/2016 | Kopardekar | G08G 5/0082 |
| 2018/0018885 A1* | 1/2018 | Khatwa | G05D 1/0055 |
| 2018/0136646 A1* | 5/2018 | Gurdan | G08G 5/045 |
| 2019/0025819 A1* | 1/2019 | Ferguson | B60W 30/12 |
| 2019/0104250 A1* | 4/2019 | Sheftel | G08G 5/04 |
| 2019/0114932 A1* | 4/2019 | Khatwa | G05D 1/042 |
| 2019/0276135 A1* | 9/2019 | van Merkensteijn, IV | B64C 1/22 |
| 2019/0318631 A1* | 10/2019 | Seaman | G06Q 20/3229 |
| 2019/0385463 A1* | 12/2019 | Cantrell | G08G 5/0021 |
| 2020/0066171 A1* | 2/2020 | Prosser | G08G 5/0078 |
| 2020/0180791 A1* | 6/2020 | Kimberly | B64C 39/024 |
| 2021/0086683 A1* | 3/2021 | Georgeson | G05D 1/042 |

FOREIGN PATENT DOCUMENTS

| | | | |
|---|---|---|---|
| CN | 108549407 B | * | 8/2019 |
| EP | 1704549 B1 | | 9/2006 |
| GB | 2476149 A | | 6/2011 |
| JP | 2005082018 A | | 7/2007 |

OTHER PUBLICATIONS

Quan, Yuan, et al., Outdoor flocking of quadcopter drones with decentralized model predictive control, Elsevier, ISA Transactions, 2017.*

Maggione, et al., BOEING, AERO, QTR, 3.09, Monitoring Real Time Engine Performance, (https://www.boeing.com/commercial/aeromagazine/articles/qtr_03_09/pdfs/AERO_Q309_article07.pdf) (2009).*

NPL, Yu, Ziqquan et al., Safe control of trailing UAV in close formation flight against actuator fault and wake vortex effect, Aerospace Science and Technology, 77 (2018), p. 189-205 (Year: 2018).*

NPL, Kim, and Kim, Three dimensional optimum controller for multiple UAV formation flight using behavior-based decentralized approach 2007 International Conference on Control, Automation and Systems Seungkeun Kim, Youdan Kim, https://www.semanticscholar.org/paper/Three-dim Published Dec. 26, 2007 (Year: 2007).*

* cited by examiner

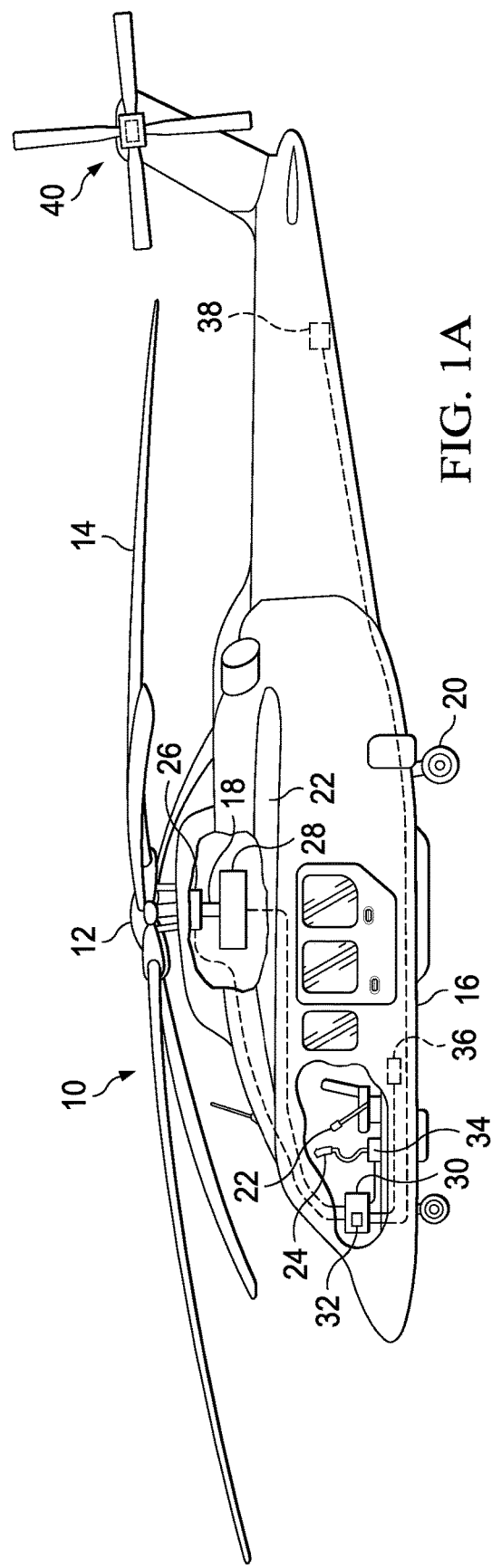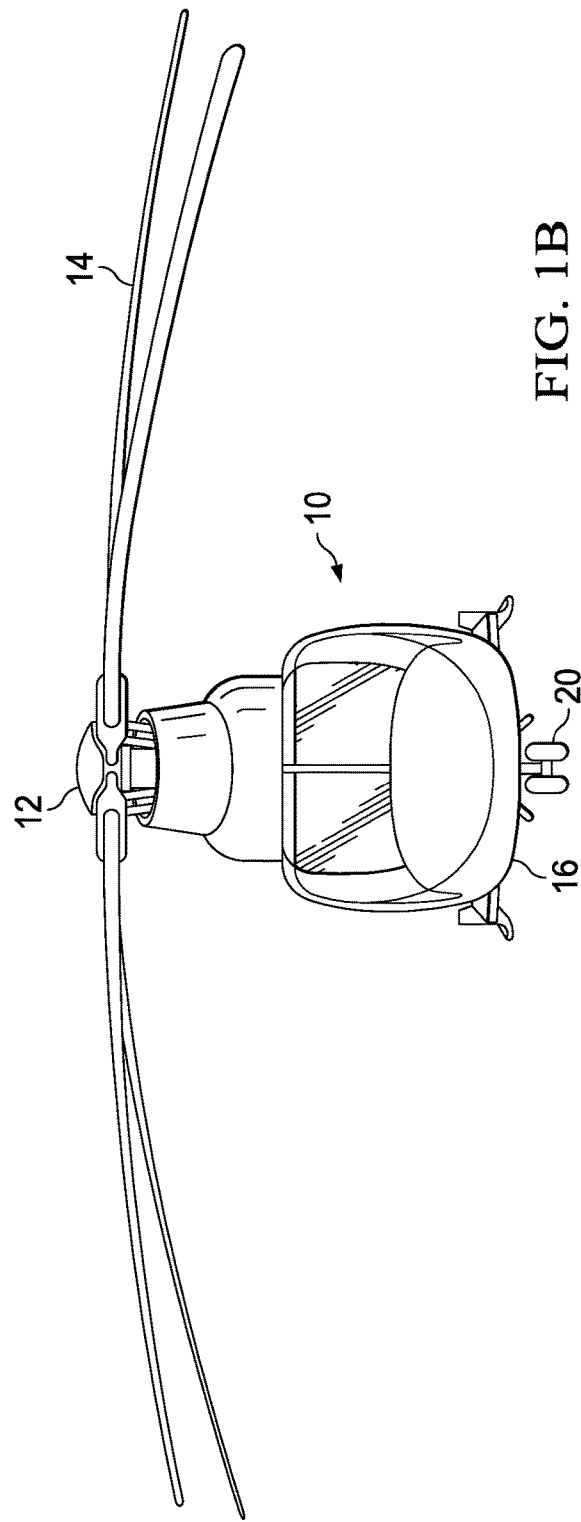

SYSTEMS AND METHODS FOR POWER REDUCTION IN FORMATION FLIGHT

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light and not as admissions of prior art.

As seen in flocking birds during flight, upon positioning in lateral trailing or "V" formation pattern, a reduction in induced drag and a related reduction in the energy exerted for flight is observed. Correspondingly, aircraft research and flight testing have confirmed that as much as 15% reduction in drag and energy is expended while in formation flight. Nevertheless, certain aircrafts to date have not been able to take advantage of real-time engagement of formation flight, due to several reasons, among them, the dissimilarity of the aircrafts in terms of type and weight class, unknown or varying atmospheric conditions, and difficult or inapplicable upfront pre-flight aerodynamic analyses of the aircrafts.

SUMMARY

According to one implementation of the present disclosure, a method for formation flight is disclosed. The method includes: during flight, arranging for a first aircraft to fly into a proximity range of a second aircraft; and determining first aircraft positioning based on power consumption data of the first aircraft, where the first aircraft positioning corresponds to power-reducing formation flight of the first aircraft.

According to another implementation of the present disclosure, a flight computer system (i.e., computer, flight control system) is disclosed. The flight control system includes a processor and a memory accessible to the processor. The memory stores instructions that are executable by the processor to perform operations including: determining, in a first positioning, a first rate of energy dissipation of the first aircraft over a first interval; determining, in a second positioning, a second rate of energy dissipation of the first aircraft over a second interval; determining whether the second rate of energy dissipation is less than the first rate of energy dissipation; and evaluating whether the first or the second positioning is an optimal positioning, wherein the optimal positioning corresponds to a reduction in energy dissipation in comparison to an initial positioning or below a power dissipation rate threshold.

According to another implementation of the present disclosure, a non-transitory computer-readable storage device storing instructions that, when executed by a processor, cause the processor to: determining, in a first positioning, a first rate of energy dissipation of the first aircraft over a first interval; determining, in a second positioning, a second rate of energy dissipation of the first aircraft over a second interval; determining whether the second rate of energy dissipation is less than the first rate of energy dissipation; and evaluating whether the first or the second positioning is an optimal positioning, wherein the optimal positioning corresponds to a reduction in energy dissipation in comparison to an initial positioning or below a power dissipation rate threshold.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

FIG. 1A illustrates a side view of an aircraft in accordance with implementations of various techniques described herein.

FIG. 1B illustrates a front view of an aircraft in accordance with implementations of various techniques described herein.

Figure 2:
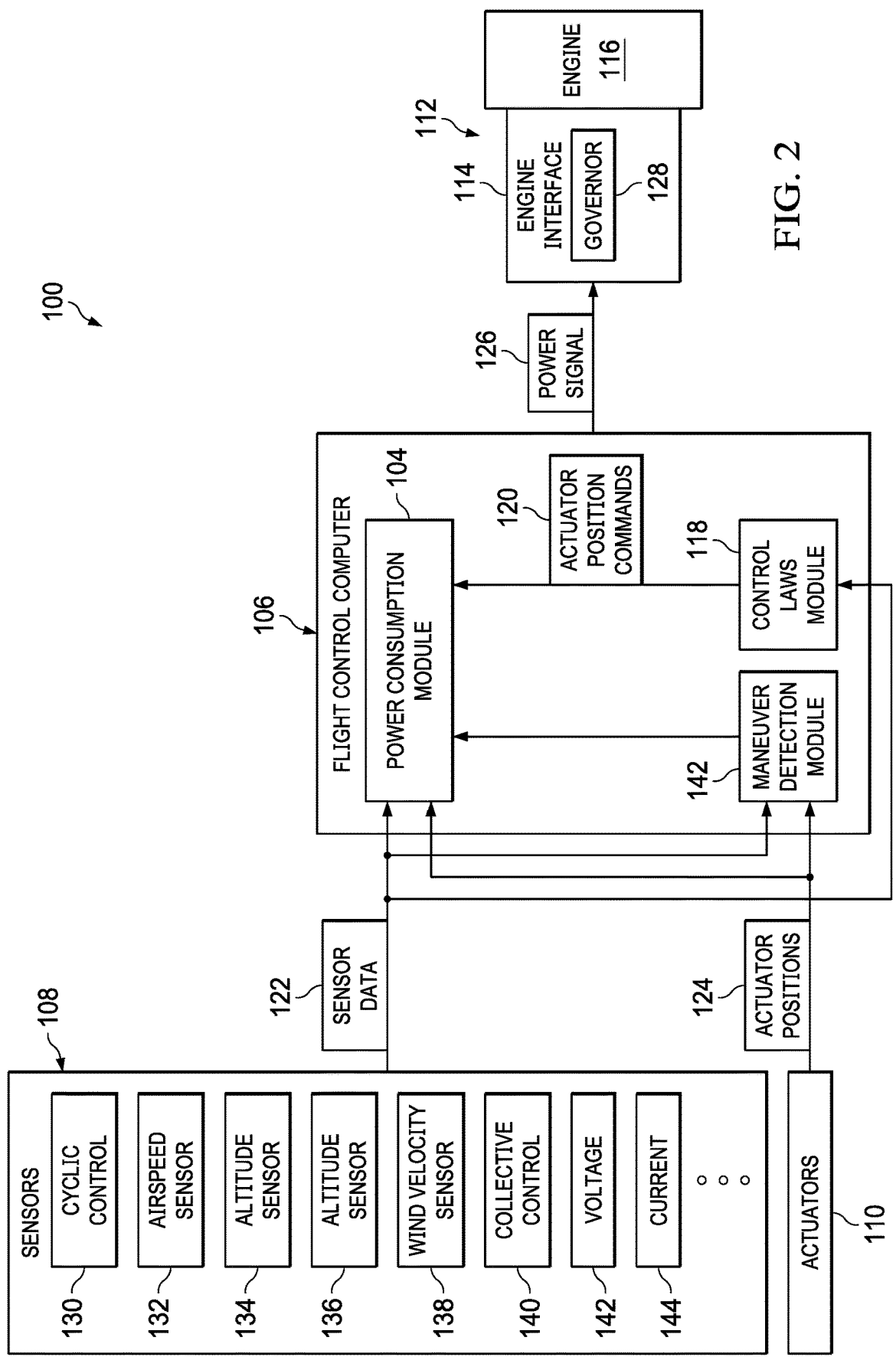
FIG. 2 illustrates a block diagram of a flight formation system in accordance with implementations of various techniques described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Systems and methods of the present disclosure utilize the benefits of decreased power consumption due to induced effects generated in formation flight. Accordingly, the systems and methods described herein allow for real-time engagement of formation flight of either associated or unassociated aircrafts (i.e., unknown to one another), and for both similar and dissimilar aircrafts without any prior aerodynamic analyses of the aircrafts or of the real-time atmospheric conditions. For example, the aircrafts may be of different types (i.e., different shapes and/or different sizes) (e.g., airplanes, helicopters, drones, or aerial vehicles etc.) but are of substantially similar weight classes.

Certain advantages include: an increased range or endurance of the aircrafts, capabilities for mission segments allowing for grouped flight, and wounded aircraft assistance when under power-challenged conditions.

In certain aspects, engagement of formation flight may be determined through a power consumption feedback-loop system to ascertain one or more "sweet spots" for respective trailing aircrafts. Moreover, exemplary systems and methods allow for the capacity for such formation flight based solely on power consumption by one or more trailing aircrafts in formation flight. Also, the systems and methods can account for aircrafts of any power-type, including piston engines, gas turbines, electric motors, or hybrid-electric motors. Furthermore, such formation flight can be performed while in ascending (climbing), descending, in hover-mode, or while in forward-flight.

Additionally, in certain cases, an exemplary flight formation system may be an advisory system for pilots. In some cases, the exemplary flight formation system may be a fully autonomous system for unmanned aerial vehicles. In some examples, the flight formation system may be a stand-alone system and in other examples, the flight formation system may be integrated as part of an on-board flight control computer and/or computers of a common computer network. In certain implementations where aircrafts of the flight formation system are manned, a pilot may manipulate one or more pilot flight controls (e.g., through a flight control computer) in order to achieve controlled aerodynamic flight. Correspondingly, inputs provided by the pilot to such pilot flight controls may be transmitted mechanically and/or electronically (e.g., via fly-by-wire flight control system) to the flight control devices for aircraft positioning in formation flight.

Referring to FIGS. 1A and 1B, an example aircraft 10 (i.e., an aerial vehicle) (e.g., rotorcraft) implementing a power reduction flight formation system is shown. While FIGS. 1A-1B illustrate the aircraft 10 as a rotorcraft, in other implementations, the aircraft 10 can be any type of aerial vehicle under power large or small (e.g., a transport aircraft, a helicopter, a commercial drone, unmanned aerial vehicles etc.). In the example, as illustrated, the aircraft 10 includes a rotor hub assembly 12 having a plurality of rotor blade assemblies 14. The rotor hub assembly 12 may be rotatable relative to a fuselage 16 of the aircraft 10. Also, the rotor hub assembly 12 may be supported atop the aircraft 10 by a mast 18. As shown, a landing gear system 20 may provide ground support for the aircraft 10. In certain implementations, the pitch of rotor blade assemblies 14 may be collectively and/or cyclically manipulated to selectively control direction, thrust and lift of the aircraft 10. A collective control 22 may be used to control the altitude of the aircraft 10 by simultaneously changing the pitch angle of all the rotor blade assemblies 14 independently of their position. Therefore, if a collective input is made by a collective control 22, the pitch angle of all rotor blade assemblies 14 change simultaneously and equally, resulting in the aircraft 10 either increasing or decreasing in altitude. A cyclic control 24 may be used to control the attitude and airspeed of the aircraft 10 by controlling the pitch of rotor blade assemblies 14 cyclically. More specifically, the relative pitch, or feathering angle, of each of the rotor blade assemblies 14 would vary as they rotate. In certain cases, the variation in relative pitch has the effect of varying the angle of attack of, and thus the lift generated by, each rotor blade assembly 14 as it rotates. Hence, if the cyclic control 24 is moved forward or backward, a rotor disk that is part of a main rotor actuation assembly 26 (to which rotor blade assemblies 14 may be coupled) tilts forward or backward and thrust is produced in the forward direction or backward direction, respectively. Similarly, if the cyclic control 24 is moved to the right or to the left, the rotor disk tilts to the right or left and thrust is produced in the right direction or left direction, respectively.

In certain implementations, as depicted in FIGS. 1A-1B, the aircraft 10 can implement a power reduction flight formation system that monitors and resolves to minimize power consumption of an engine 28. The engine 28 may generate a power output to provide rotational energy to rotor hub assembly 12. The aircraft 10 may further include a flight control computer (FCC) 30 implementing a power consumption feedback module 32 (e.g., a power consumption module alone or a combined power consumption module and a power expectance module in some implementations). Moreover, the aircraft 10 can be a fly-by-wire aircraft.

For such implementations, the power consumption feedback module 32 may utilize sensor data from sensors 34, 36, 38 (e.g., as part of a pitot-tube system/probe). The sensors 34, 36, 38 may detect various flight parameters of the aircraft 10, such as the position or motion of cyclic control 24, airspeed, altitude and/or wind velocity, among others. Moreover, the power consumption feedback module 32 can similarly solely voltage and/or current sensors to measure rates of change in power consumption (e.g., a power demand on the engine 28).

In addition, to further monitor power consumption, the power consumption feedback module 32 may utilize commands issued by a control laws module implemented by the flight control computer 30 to anticipate various power demands on the engine 28. In particular, the commands utilized by the power consumption feedback module 32 may be actuator position commands, based on control laws, that move the main rotor actuation assembly 26 and/or other actuators on the aircraft 10 based on the sensor data from the sensors 34, 36, 38. Non-limiting examples of actuator position commands and other commands that may be utilized by power consumption feedback module 32 include cyclic actuator demands, collective actuator commands, any combination of rotor actuator commands, as may be used in mixed systems, directional actuator commands, etc. In other implementations, the power expectance module 32 may utilize the positions of the actuators in the aircraft 10, including the main rotor actuation assembly 26, to anticipate the power demand on the engine 28. In addition to the actuator positions of the main rotor actuation assembly 26, power expectance module 32 may also use the positions of actuators for a tail rotor 40 or any movable control surfaces on aircraft 10. Thus, the power expectance system implemented aircraft 10 may utilize a wide variety of data sources to anticipate power demand on engine 28, thereby better monitoring power demand.

Referring to FIG. 2, the example power consumption system (i.e., flight formation system) 100 is shown. As illustrated, the system 100 may be implemented on the aircraft 10 and includes power consumption module 104 (including the formation flight program 622 and power-save feedback-loop procedure 500) executed on flight control computer (FCC) 106, in data communication with one or more sensors 108, one or more actuators 110 and an engine subsystem 112 that includes an engine interface 114 and one or more engines 116. The flight control computer 106 includes a control laws module 118 that generates actuator position commands 120 to move the actuators 110 based on sensor data 122 from the sensors 108. Advantageously, in certain implementations, the power consumption module 104 may utilize sensor data 122, solely from, voltage and/or current sensors 142, 144 of the sensors 108. In addition, in other implementations, the power consumption module 104 in conjunction with a power expectance module (not shown) may utilize sensor data 122 from sensors 108, actuator position commands 120, control laws module 118, actuator positions 124 of actuators 110, or any combination thereof to determine (and in certain implementations, anticipate) the real-time power demand of the engine 116.

Furthermore, in certain aspects, the system 100 may generate a power signal 126 that is transmitted to an engine interface 114 such that a governor 128 may adjust power output of engine 116. For instance, such aspects may be performed either in response to a pilot's command or in the case of unmanned computer-controlled aircrafts (or in autopilot mode), as directed by the flight control computer 106 of the aircraft 10. In certain instances, the governor 128 may adjust the power output of the engine 116 before application of the power signal 126 by the power consumption module 104 to the engine 116 to maintain the rotational speed of one or more rotors of aircraft 10 within a determined aircraft positioning (as discussed in below paragraphs).

In one implementation, the sensors 108 may detect flight parameters of the aircraft 10 to form the sensor data 122 that is utilized by the power consumption module 104, either directly or indirectly. The sensors 108 can include a cyclic control sensor 130 that detects the position or motion of a cyclic control, forming part of the sensor data 122.

The sensors 108 may include an airspeed sensor 132 as part of a pitot-tube/pitot-system) that can utilize a doppler radar, global positioning satellites or other airspeed detection techniques. The sensors 108 may also include an altitude sensor 134, such as a radar altimeter, an attitude sensor 136 and/or a wind velocity sensor 138. Furthermore, the sensors 108 can include a collective control sensor 140 that detects a position or movement of the collective control of aircraft 102. Hence, the different types of sensors 108 that may be used by the system 100 are numerous, non-limiting examples of which include a weight sensor, such as a cargo weight sensor, a rotor speed sensor, a nacelle tilt angle sensor, a helicopter or tiltrotor aircraft pylon angle sensor, a power turbine output speed sensor, a gas temperature sensor, a throttle position sensor, a compressor speed sensor, an engine torque output sensor, an actuator position sensor, a pressure altitude sensor, a compressor air temperature sensor, a fuel metering valve position sensor, etc.

The control laws module 118 may generate commands to maintain a suitable yaw, pitch and roll of the aircraft 10, as well as issue commands to maintain the power output required by the engine 116 to maintain these three axes. The control laws module 118 may also issue other commands such as a G-command, pitch rate feedback or C-command, to regulate flight of the aircraft 10. The actuators 110 may include any actuator that moves a portion of the aircraft 10, such as the rotor blade assemblies 144, based on the sensor data 122. The actuators 110 may each be movable between a plurality of actuator positions 124. The actuators 110 may include main rotor actuators that are operable to adjust the pitch angle of the rotor blade assemblies 144, either collectively or cyclically. In some cases, examples of other types of actuators 110 that may be implemented include tail rotor actuators or control surface actuators.

In certain cases, the power consumption module 104 may anticipate additional power consumption on the engine 116 using sensor data 122 to form a power signal 126 (e.g., power consumption signal). For example, the power signal 126 may be received by the engine interface 114 and used by the governor 128 to adjust the power output of the engine 116. In one scenario, the system 100 may receive sensor data 122 that includes a cyclic control position, detected by cyclic control sensor 130 to adjust the cyclic pitch of the rotor blade assemblies 144 such that an increased power output has been demanded from the engine 116. In such an example, the power signal 126 may cause the engine interface 114 to increase the power output of the engine 116.

In some instances, the system 100 may indirectly use the sensor data 122 via the control laws module 118, thus utilizing any feedback terms (e.g., based on feedback procedures of the power consumption module 104 as described herein) issued by the control laws module 118. In one example, the system 100 may anticipate the power expectance from engine 116 using actuator position commands 120 that may be derived from sensor data 122 and utilize the feedback terms to form the power signal 126.

The system 100 may also compensate for increases in power expectance and power consumption rate due to inputs in various axes, such as laterally or directionally, with differing ambient condition or vehicle state compensation schedules. In some embodiments, the system 100 may filter the power signal 126 to remove one or more steady components, and/or shape power signal 126 to match a flight positioning for formation flight (that can be associated with one or more flight parameters detected by sensors 108). The system 100 may also adjust power signal 126 based on an ambient condition, such as altitude data from altitude sensor 134 or airspeed data from the airspeed sensor 132. In some implementations, the system 100, in generating the power signal 126, may provide differing weights to the sensor data 122, the actuator position commands 120, and the actuator positions 124 according to a weighting algorithm. For example, the power consumption module 104 may give differing weights to the data provided by the various sensors 108. Moreover, the power consumption module 104 may weigh the data from each of cyclic control sensor 130, altitude sensor 134 and collective control sensor 140 differently when generating the power signal 126 (e.g., power expectance signal).

The system 100 may also include a maneuver detection module 142 that detects a maneuver (e.g., movement to determine power consumption "sweet spot" as discussed in below paragraphs) performed by the aircraft 102 based on the sensor data 122. In some implementations, the system 100 may indirectly use the sensor data 122 to form the power signal 126 by processing the maneuvers detected by the maneuver detection module 142. The system 100 may also include any equipment required to enable aircraft-to-aircraft communication (e.g., wireless networking).

Figure 3:
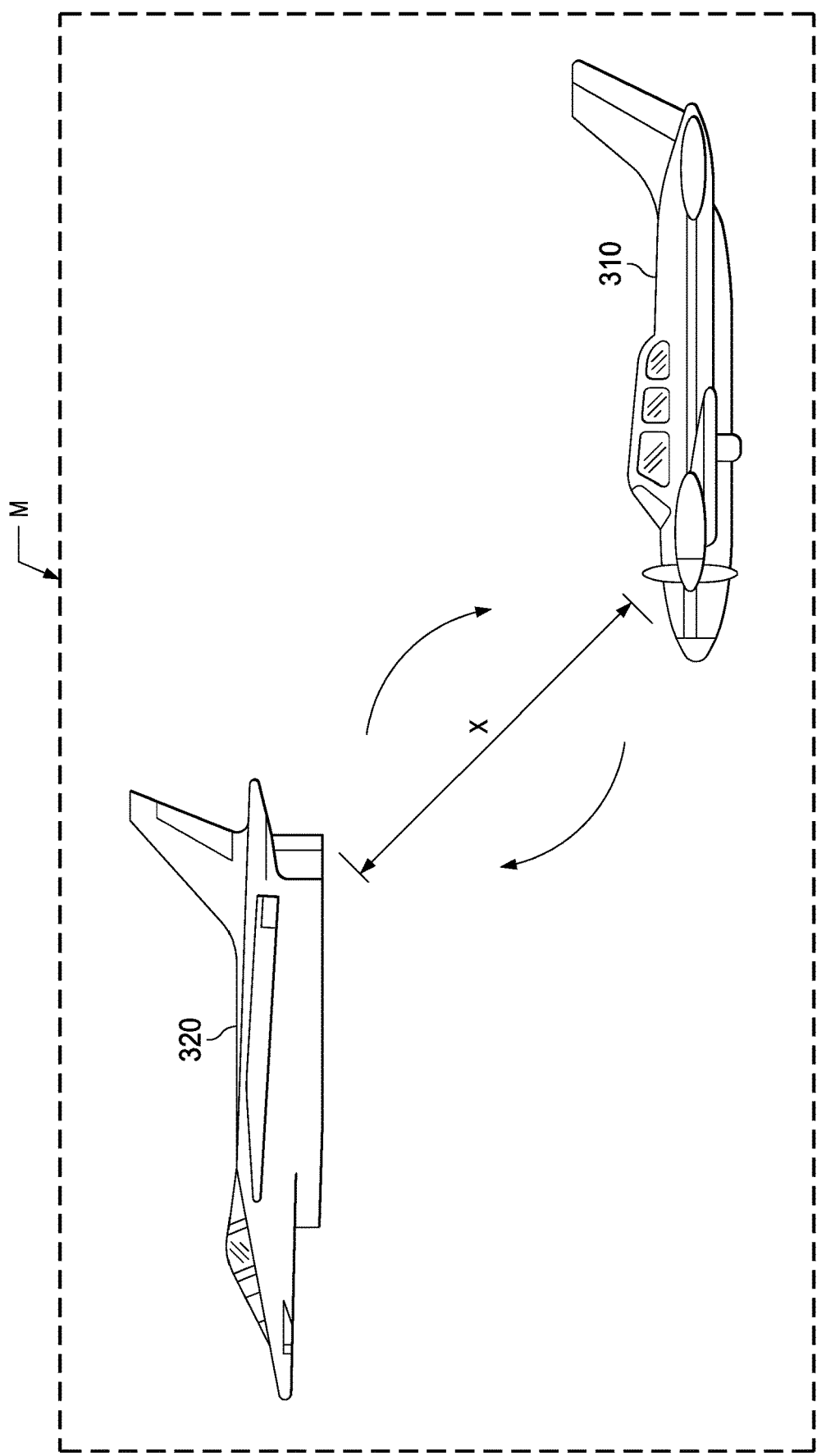
FIG. 3 illustrates a side view of aircrafts in formation flight in accordance with implementations of various techniques described herein.

Referring to FIG. 3, the example aircraft 10 is shown as a trailing aircraft 310 (i.e., first aircraft) with relation to a lead aircraft 320 (i.e., a second aircraft) for engagement in formation flight. While the illustration of FIG. 3 depicts two aircrafts, in other implementations, three or more aircrafts can be engaged for formation flight. In various implementations, such formation flight can be performed while in ascending (climbing), descending, in hover-mode, or while in forward-flight. Also, the aircrafts 310, 320 may either be manned or un-manned aerial vehicles (e.g., autonomous aerial vehicles). Moreover, the aircrafts 310, 320 may include piston engines, gas turbines, or include electric motors. Notably, as shown, the aircrafts would be within an established proximity and separated by a minimum separation distance X required to ensure against aircraft collision. In certain aspects, the minimum separation distance X may be based on predetermined criteria including, but not limited to various flight atmospheric conditions such a turbulence and weather, environmental factors including proximity to various terrain, types of aircrafts, etc. Also, in FIG. 3, a proximity range M to enable the flight formation system is shown. The proximity range M of the lead aircraft may be the range necessary for reliable aircraft-to-aircraft communication. The method of communication may be of any type of communication allowing for data transfer such as wireless networks.

Advantageously, the aircrafts 310, 320 may be of different types (i.e., different shapes and/or different sizes) (e.g., airplanes, helicopters, drones, or aerial vehicles etc.) but are of substantially the similar weight classes. Suitably, the aircrafts 310, 320 involved for formation flight may share (communicate) power consumption information as feedback for preferred positioning. In certain examples, direct communication of power information may be transmitted between the aircrafts. For example, such communication may be a simple addition to preexisting automated aircraft messaging that would already exist for air-traffic control purposes. Furthermore, in certain implementations, respective location coordinates can also be communicated between the aircrafts 310, 320. Also, in some cases, the aircrafts 310, 320 (or additional aircrafts) have the capability to switch positions to optimally conserve power between each of the aircrafts flying in formation.

Moreover, in various examples, while power consumption data may be monitored for the first aircraft 310, in different scenarios, the aircraft positioning for formation flight may be performed on: the trailing aircraft 310 alone, the lead aircraft 320 alone, or both aircrafts 310, 320.

Figure 4:
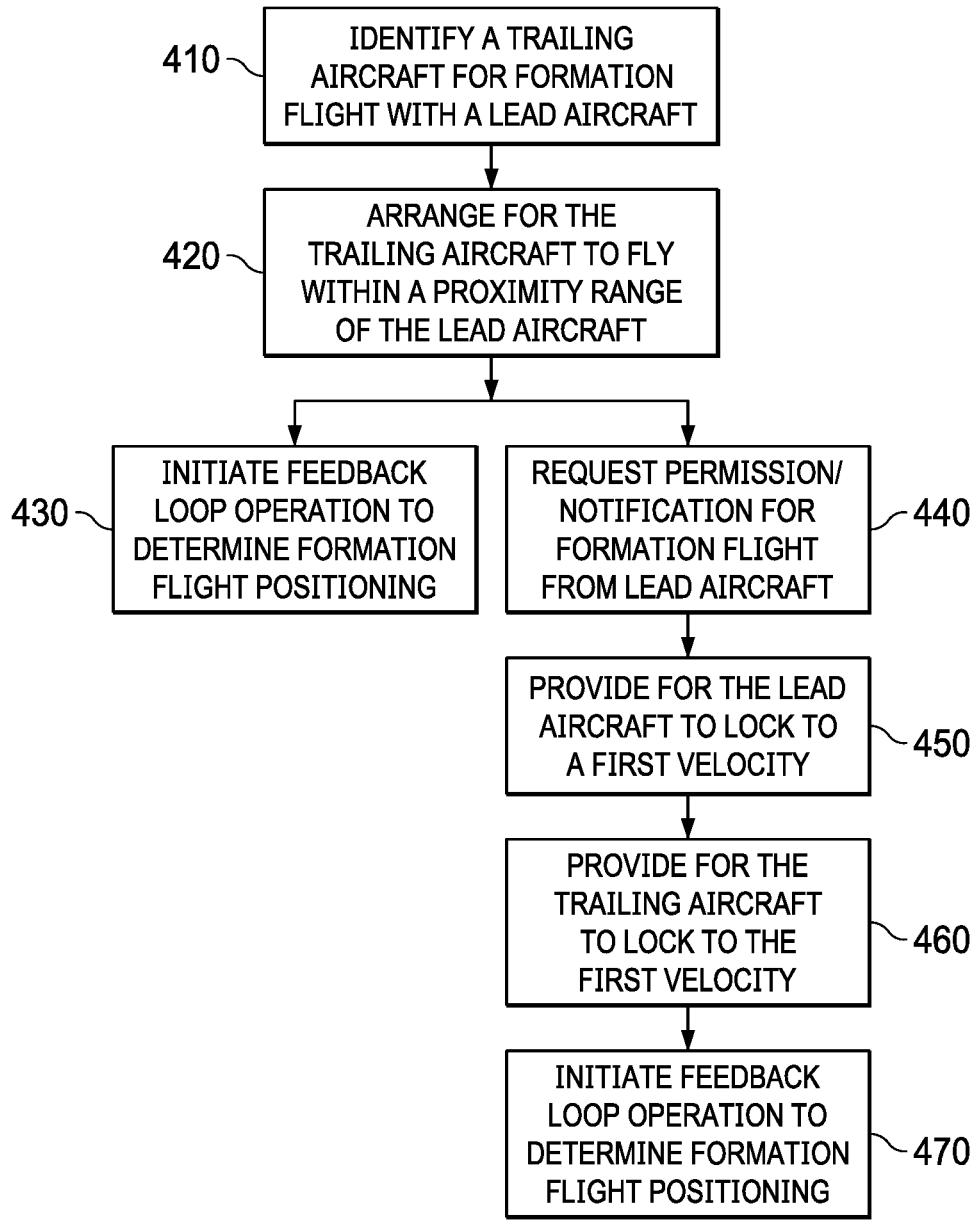
FIG. 4 is a particular illustrative aspect of methods in accordance with implementations of various techniques described herein.

Referring to FIG. 4, a flowchart of an example operational method 400 for aircraft positioning in formation flight for one or more trailing aircrafts (e.g., the trailing aircraft 310) (i.e., first aircraft) is shown. The example method 400 may be implemented as part of the formation flight program 622 (as shown as part of computer 610 in FIG. 6).

Prior to the operation, during flight, the trailing aircraft 310 locates one or more other aircrafts (e.g., the lead aircraft 320) (i.e., a second aircraft) traveling substantially along the same route. Initially, the trailing aircraft 310 may fly into an arbitrary positioning in a general vicinity of the one or more other aircrafts. For instance, in certain implementations, the trailing aircraft 310 may either speed up or slow down to arrive to an initial positioning with respect to the one or more other aircrafts (e.g., the lead aircraft 320).

In one example operation, during forward-flight (e.g., cruise mode), in a first step 410, the system 100 (within a trailing aircraft) identifies that the trailing aircraft 310 can fly in formation flight with one or more aircrafts (e.g., the lead aircraft 320) that are traveling along a particular channel (i.e., air-route). Upon such an identification, the FCC 106 of the system 100, in some implementations (e.g., in autonomous aircrafts, UAVs, etc.) may automatically determine whether to engage the flight formation system 100 of the trailing aircraft 310. In other implementations, the FCC 106 of the system 100 may notify and request a pilot of the trailing aircraft 310 that the formation flight system 100 may be engaged to conserve power.

In a second step 420, upon engagement of the flight formation system 100, the trailing aircraft 310 would fly into the proximity range M of the lead aircraft 320. In certain alternative examples, the identification of step 410 may occur while the trailing aircraft 310 may already be within the proximity range M.

Upon arriving within the proximity range M of the lead aircraft 320, at step 430, in some cases, the system 100 may engage the system feedback-loop operation 500 (i.e., power-save feedback loop operation as described below in greater detail) to determine formation flight positioning based on a minimal power consumption of the trailing aircraft 310. If, in such cases, the trailing aircraft 310 is a manned aircraft, the system 100 would provide notification or request permission from the pilot of the trailing aircraft 310 to engage the system feedback loop operation 500. Alternatively, for unmanned aircrafts, the system 100 may provide either provide notification, request permission from a separate computer system located elsewhere from the trailing aircraft 310, or automatically self-engage the system feedback loop operation 500.

In certain cases, at step 440, the system 100, upon arriving within the proximity range M of the lead aircraft 320, whether for a manned or unmanned trailing aircraft 310, may request formation flight of the lead aircraft 320. In doing so, the system 310 may enable communication between the trailing and lead aircrafts 310, 320.

At step 450, upon the lead aircraft 320 accepting the request for formation flight, the system 100 requests the lead aircraft 320 to lock its velocity. Next, once the lead aircraft 320 may transmit an acknowledgement confirming that its velocity is locked, at step 460, the system 100 provides for the trailing aircraft 310 to also lock its velocity matching that of the lead aircraft 320. In addition, at this point, the system 100 may also be configured to monitor any changes of flight pattern of the lead aircraft 320. For instance, the system 100 would detect if the lead aircraft 320 were to throttle backwards and potentially cause a collision. If a change is in aircraft positioning of the lead aircraft 320 is detected, evasive maneuvering of the first aircraft 310 would be enabled to prevent collision. Hence, in doing so, the trailing aircraft 310 (as directed by the system 100) would maintain a safe following distance the lead aircraft 320.

At step 470, utilizing the trailing aircraft 310 flight controls, the system 100 would initiate the system feedback loop operation 500. In doing so, the system 100 would implement predetermined maneuvering of the trailing aircraft 310 to determine the power reduction "sweet spot" (i.e., the specific aircraft trailing positioning to enable minimal power consumed yet still maintaining the minimum separation distance X). For instance, the system 100 may direct the trailing aircraft 310 to "float around" (i.e., move within a range of directions in a three-dimensional space (e.g., up, down, backward, forward, side-to-side)) while monitor energy dissipation of the trailing aircraft 310 at various positionings over different time intervals. In some cases, the energy dissipation may be monitored through voltage and current sensors 142, 144 that monitor voltage and current usage. In other cases, such as larger aircrafts, energy dissipation may be monitored through tracking fuel flow. In this manner, the trailing aircraft 310 may settle into an optimum positioning to conserve energy based on a rate of power consumption.

In alternative example operations, instead of locking velocities of the aircrafts 310, 320, the power setting of the trailing aircraft 310 can be set to maximum threshold. Upon doing so, the trailing aircraft 310 can be controlled to maneuver in various directions to different altitudes and at different velocity. In doing so, reductions in rate of power at various flight formation positionings can be measured.

Figure 5:
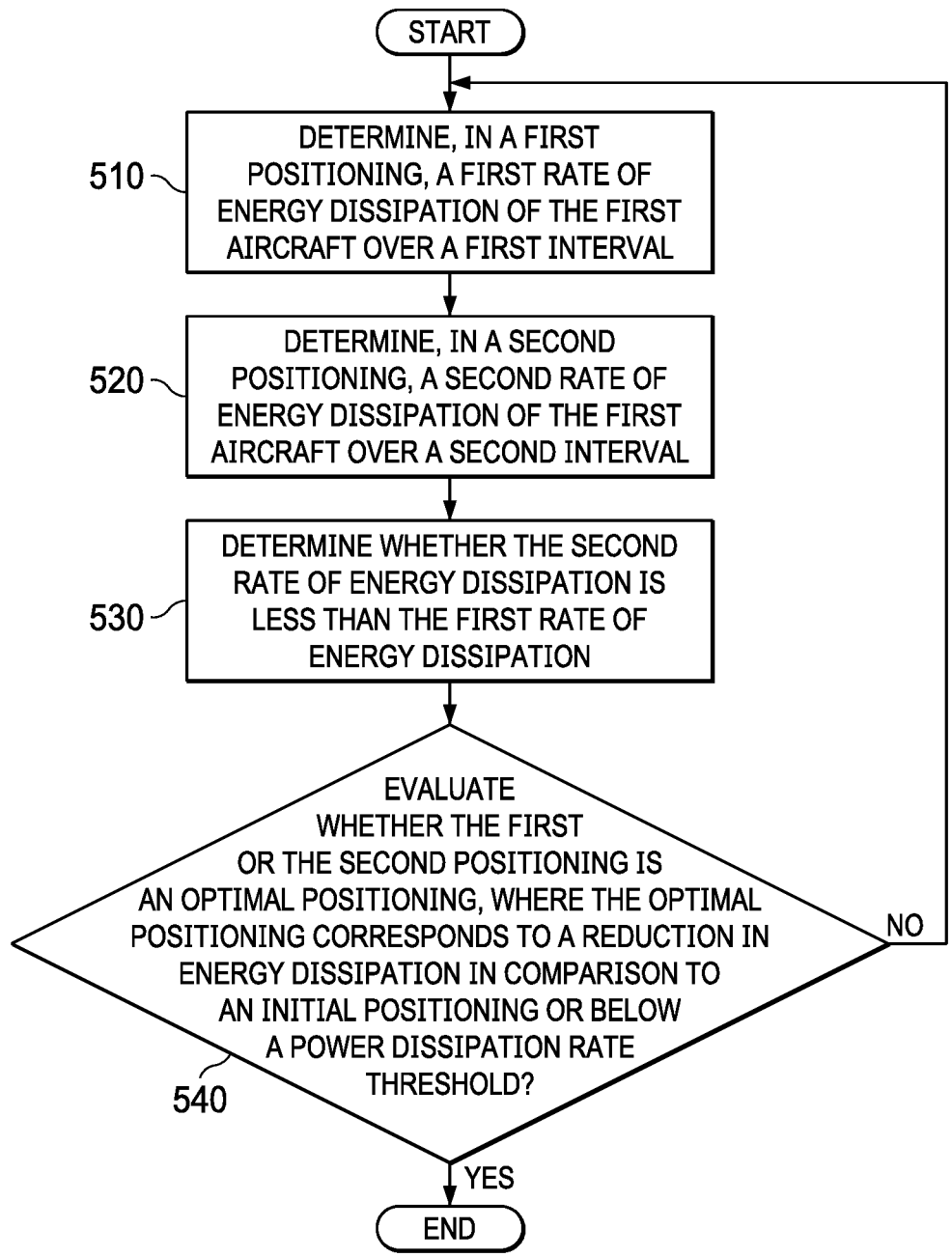
FIG. 5 is a particular illustrative aspect of methods in accordance with implementations of various techniques described herein.

Referring to FIG. 5, a flowchart of an example aircraft feedback procedure 500 for one or more trailing aircrafts (e.g., trailing aircraft 310) is shown. The example procedure 500 may be implemented as part of the formation flight program 622 (as shown as part of computer 610 in FIG. 6).

In one particular implementation, the example aircraft feedback procedure (i.e., power-save feedback loop operation) 500 of the system 100 may include the following steps in order: (1) At block 510, in a first prospective positioning (e.g., in a next prospective positioning), determining a first rate of energy dissipation of the trailing aircraft 310 over a first interval; (2) at block 520, in a second prospective positioning (e.g., in another prospective positioning), determining a second rate of energy dissipation of the aircraft 310 over a second interval; (3) at block 530, determining whether the second rate of energy dissipation is less than the first rate of energy dissipation; and (4) at block 540, evaluating whether the first or the second prospective positioning is an optimal positioning. For example, if the evaluation is yes, the operation 500 would END; and if the evaluation is NO, the operation 500 would go back to back to step (1).

In further implementations, the formation flight program 622 may be periodically implemented to ensure that a flight positioning remains the optimal flight positioning based on any changed atmospheric conditions or environmental factors.

Advantageously, in certain implementations, the formation flight program 622, as part of flight computer system 610 as described in below paragraphs (or flight formation system 100 with respect to FIG. 1), may automatically position the trailing aircraft 310 for formation flight within predefined safety limits. Moreover, in some implementations, the computer system 600 (as described below) may automatically position both the lead and trailing aircrafts 310, 320 for formation flight within predefined safety limits.

Figure 6:
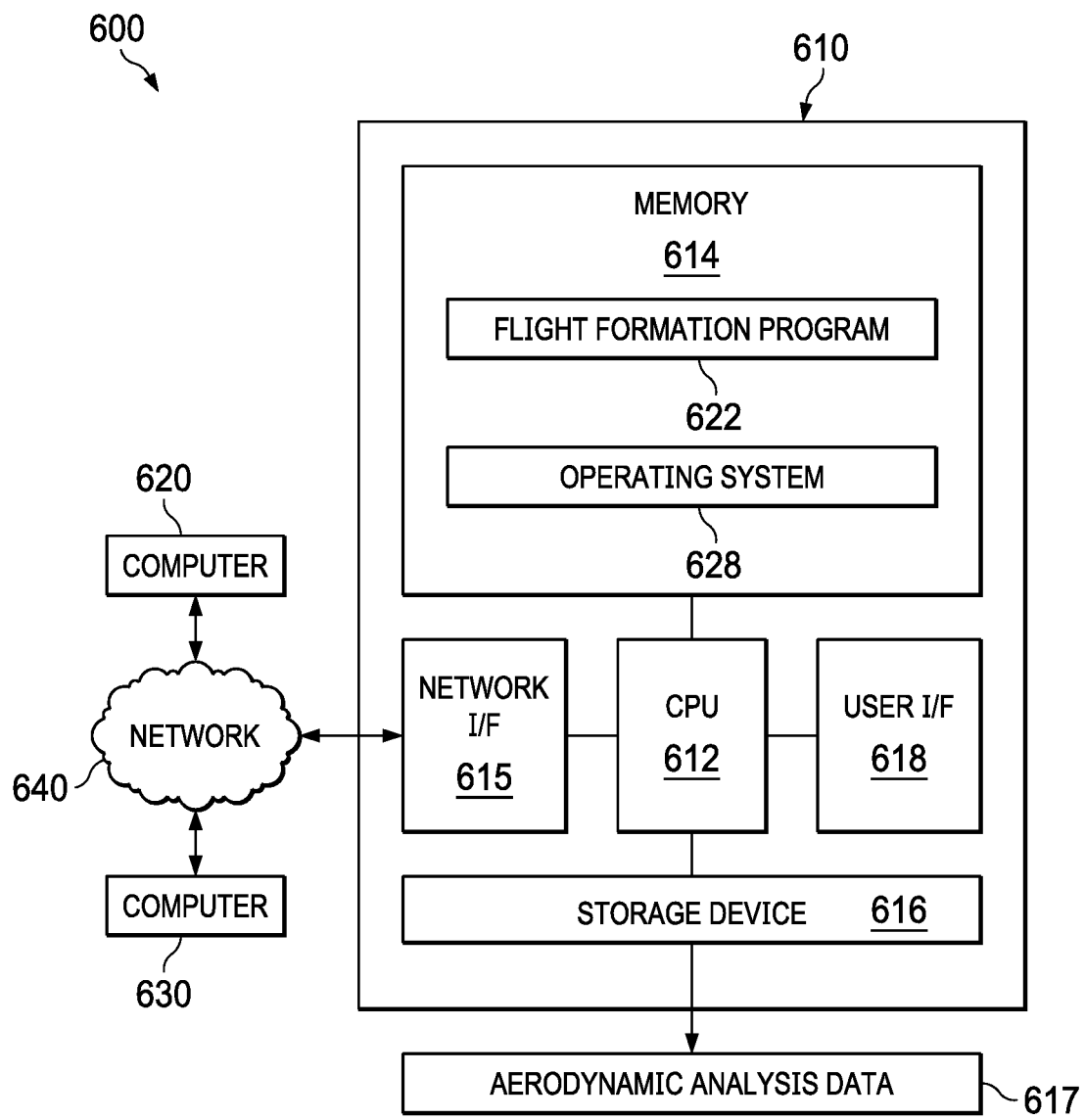
FIG. 6 is a block diagram of a computer system in accordance with implementations of various techniques described herein.

FIG. 6 is a diagram depicting the computer system 600 (e.g., networked computer system and/or server) according to one implementation. FIG. 6 illustrates example hardware components in the computer system 600 that may be used to determine and/or adjust an optimal flight positioning for formation flight for the trailing and lead aircrafts 310, 320. The computer system 600 includes a computer 610 (i.e., computer, flight computer system, flight controls and avionics computer system) (e.g., flight formation system 100 of the aircraft 10 in FIG. 1) which may be implemented as a server or a multi-use computer that is coupled via a network 640 to one or more networked (client) computers 620, 630. The methods 400, 500 may be stored as program code (e.g., formation flight program 622) in memory that may be performed by the computer 610, the computers 620, 630, other networked electronic devices (not shown) or a combination thereof. In some implementations, the flight formation program 622 may read input data (e.g., received measurements from the sensors 108 and pre-flight aerodynamic analysis data 617) (e.g., as described with reference to FIGS. 1A-B, 2, and 6 herein) and provide controlled output data to various connected computer systems. In certain implementations, each of the computers 610, 620, 630 may be any type of computer, computer system, or other programmable electronic device. Further, each of the computers 610, 620, 630 may be implemented using one or more networked (e.g., wirelessly networked) computers, e.g., in a cluster or other distributed computing system. Each of the computers 610, 620, 630 may be implemented within a single computer or programmable electronic device, e.g., an aircraft flight control computer, a ground-based flight control system, a flight monitoring terminal, a laptop computer, a hand-held computer, phone, tablet, etc. In one example, the computer system 610 may be an onboard flight control computer (e.g., flight control computer 108 that is configured to receive sensor data from the sensors 108). In such an example, the computer 610 may be located on the trailing aircraft 310, the computer 620 may be located on the lead aircraft 320, and the computer 630 may be a part of the computer system at a ground location monitoring at least one or more of the aircrafts in formation flight.

Advantageously, in example implementations, one or more of the computers 610, 620, and 630 of the flight computer system 600 may determine an optimal flight positioning for formation flight of the applicable aircrafts.

In one implementation, the computer 600 includes a central processing unit (CPU) 612 having at least one hardware-based processor coupled to a memory 614. The memory 614 may represent random access memory (RAM) devices of main storage of the computer 610, supplemental levels of memory (e.g., cache memories, non-volatile or backup memories (e.g., programmable or flash memories)), read-only memories, or combinations thereof. In addition to the memory 614, the computer system 600 may include other memory located elsewhere in the computer 610, such as cache memory in the CPU 612, as well as any storage capacity used as a virtual memory (e.g., as stored on a storage device 616 or on another computer coupled to the computer 610). The memory 614 may include the flight formation program 622 for two or more aircrafts for engagement in formation flight.

In FIG. 6, the storage device 616 is shown to include aerodynamic analysis data 617. In other alternative implementations, the aerodynamic analysis data 617 may be stored in the memory 614, in memory in the computers 620, 630, or in any other connected or networked memory storages devices. In some implementations, the aerodynamic analysis data 617 includes general shape, sizes, and weight models for aircrafts suitable for flight formation that are likely to be encountered. While in some cases, such aerodynamic analysis may be available and can be utilized for flight formation, implementations as described herein do not require such analysis to determine and engage in flight formation.

The computer 610 may further be configured to communicate information externally. To interface with a user or operator (e.g., pilot, aerodynamicist, engineer), the computer 610 may include a user interface (I/F) 618 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 610 may include a network interface (I/F) 615 which may be coupled to one or more networks 640 (e.g., a wireless network) to enable communication of information with other computers and electronic devices. The computer 610 may include analog and/or digital interfaces between the CPU 612 and each of the components 614, 615, 616, and 618. Further, other non-limiting hardware environments may be used within the context of example implementations.

The computer 610 may operate under the control of an operating system 628 and may execute or otherwise rely upon various computer software applications, components, programs, objects, modules, data structures, etc. (such as the flight formation program 622 and related software). The operating system 628 may be stored in the memory 614. Operating systems include, but are not limited to, UNIX® (a registered trademark of The Open Group), Linux® (a registered trademark of Linus Torvalds), Windows® (a registered trademark of Microsoft Corporation, Redmond, WA, United States), AIX® (a registered trademark of International Business Machines (IBM) Corp., Armonk, NY, United States) i5/OS® (a registered trademark of IBM Corp.), and others as will occur to those of skill in the art. The operating system 628 and the flight formation program 622 in the example of FIG. 6 are shown in the memory 614, but components of the aforementioned software may also, or in addition, be stored at non-volatile memory (e.g., on storage device 616 (data storage) and/or the non-volatile memory (not shown). Moreover, various applications, components, programs, objects, modules, etc. may also execute on one or more processors in another computer coupled to the computer 610 via the network 640 (e.g., in a distributed or client-server computing environment) where the processing to implement the functions of a computer program may be allocated to multiple computers 620, 630 over the network 640.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 614, the storage device 616, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of formation flight, comprising:
during flight, arranging for a first aircraft not a part of a V-flight formation to fly into a proximity range of a second aircraft to be detected by the second aircraft and to request entry into the flight formation with the second aircraft; and
enabling, upon the request being accepted, communication between the trailing and lead aircrafts; and
determining first aircraft positioning based on power consumption data of the first aircraft,
wherein the first aircraft positioning relative to the second aircraft is based on energy conservation formation flight of the first aircraft.

2. The method of claim 1, wherein the first aircraft corresponds to a trailing aircraft of the formation flight and the second aircraft corresponds to a lead aircraft of the formation flight.

3. The method of claim 1, further comprising:
transmitting the power consumption data from the first aircraft to the second aircraft.

4. The method of claim 1, further comprising:
transmitting location coordinate data of the first aircraft to the second aircraft.

5. The method of claim 1, further comprising:
providing for the second aircraft to lock to a first velocity; and
providing for the first aircraft to lock to the first velocity.

6. The method of claim 1, wherein determining the first and second aircrafts positioning is based on predetermined maneuvering of the first aircraft.

7. The method of claim 5, wherein determining the first and second aircrafts positioning is based on monitoring energy dissipation of the first aircraft at different positionings over different time intervals.

8. The method of claim 7, further comprising:
monitoring to detect changes in positioning of the second aircraft; and
if a change in the positioning of the second aircraft is detected, enabling evasive maneuvers of the first aircraft to prevent collision.

9. The method of claim 1, wherein determining the first and second aircraft positioning is based on an aircraft feedback procedure, wherein the aircraft feedback procedure comprises: determining, in a first positioning, a first rate of energy dissipation of the first aircraft over a first interval; determining, in a second positioning, a second rate of energy dissipation of the first aircraft over a second interval; determining whether the second rate of energy dissipation is less than the first rate of energy dissipation; and evaluating whether the first or the second positioning is an optimal positioning, wherein the optimal positioning corresponds to a reduction in energy dissipation in comparison to an initial positioning or below a power dissipation rate threshold.

10. The method of claim 9, wherein the optimal positioning is based at least in part on a minimum separation distance.

11. The method of claim 1, wherein the first and second aircrafts include different shapes or sizes.

12. The method of claim 1, wherein the first and second aircraft are manned or unmanned aircrafts.

13. The method of claim 1, wherein the power consumption data is transmitted with aircraft messaging transmitted for air-traffic control.

14. The method of claim 1, further comprising:
determining power consumption data by voltage and currents sensors of the first aircraft.

15. The method of claim 1, wherein the first and second aircrafts comprise power systems including piston engines, gas turbines, electric motors, or hybrid-electric motors.

16. The method of claim 1, further comprising: determining second aircraft positioning based on the power consumption data of the first aircraft, wherein the second aircraft positioning corresponds to power-reducing formation flight of the first aircraft.

17. The method of claim 1, further comprising: providing request notification from the first aircraft to the second aircraft for the formation flight; and providing acceptance notification from the second aircraft to the first aircraft for the formation flight.

18. The method of claim 1, further comprising: providing an advisory display corresponding to a rate of change of the power consumption data.

19. A flight computer system comprising: a processor; and a memory accessible to the processor, the memory storing instructions that are executable by the processor to perform operations comprising:
flying into a proximity range of a second aircraft to be detected by the second aircraft and to request a new V-flight formation with the second aircraft;
enabling, upon the request being accepted, communication between the trailing and lead aircrafts;
determining in a first positioning, a first rate of energy dissipation of a first aircraft over a first interval;
determining, in a second positioning, a second rate of energy dissipation of the first aircraft over a second interval;
determining whether the second rate of energy dissipation is less than the first rate of energy dissipation; and
evaluating whether the first or the second positioning, relative to a second aircraft in the new flight formation with the first aircraft, is an optimal positioning, wherein the optimal positioning corresponds to a reduction in energy dissipation in comparison to an initial positioning or below a power dissipation rate threshold.

20. A non-transitory computer-readable storage device storing instructions that, when executed by a processor, cause the processor to:
flying into a proximity range of a second aircraft to be detected by the second aircraft and to request a new V-flight formation with the second aircraft;
determining, in a first positioning, a first rate of energy dissipation of a first aircraft over a first interval;
enabling, upon the request being accepted, communication between the trailing and lead aircrafts in a second positioning,
determining a second rate of energy dissipation of the first aircraft over a second interval;
determining whether the second rate of energy dissipation is less than the first rate of energy dissipation; and
evaluating whether the first or the second positioning, relative to a second aircraft in the new flight formation with the first aircraft, is an optimal positioning, wherein the optimal positioning corresponds to a reduction in energy dissipation in comparison to an initial positioning or below a power dissipation rate threshold.

* * * * *

UNITED STATES PATENT AND TRADEMARK OFFICE
CERTIFICATE OF CORRECTION

PATENT NO. : 11,887,493 B2
APPLICATION NO. : 16/545938
DATED : August 20, 2019
INVENTOR(S) : Kip Gregory Campbell et al.

Page 1 of 1

It is certified that error appears in the above-identified patent and that said Letters Patent is hereby corrected as shown below:

In the Claims

In Column 16, Claim 20, Line 18, change "flying" to --fly--

In Column 16, Claim 20, Line 21, change "determining, in a first positioning," to --determine, in a first position,--

In Column 16, Claim 20, Line 23, change "enabling" to --enable--

In Column 16, Claim 20, Line 25, change "positioning," to --position,--

In Column 16, Claim 20, Line 26, change "determining" to --determine--

In Column 16, Claim 20, Line 28, change "determining" to --determine--

In Column 16, Claim 20, Line 30, change "evaluating" to --evaluate--

In Column 16, Claim 20, Line 30, change "positioning," to --position,--

In Column 16, Claim 20, Line 32, change "positioning," to --position,--

In Column 16, Claim 20, Line 33, change "positioning" to --position--

In Column 16, Claim 20, Lines 34-35, change "position-ing" to --position--

Signed and Sealed this
Fifth Day of March, 2024

Katherine Kelly Vidal
*Director of the United States Patent and Trademark Office*